(12) United States Patent
Alecu

(10) Patent No.: US 7,604,201 B2
(45) Date of Patent: Oct. 20, 2009

(54) NACELLE DRAG REDUCTION DEVICE FOR A TURBOFAN GAS TURBINE ENGINE

(75) Inventor: Daniel T. Alecu, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 372 days.

(21) Appl. No.: 11/560,941

(22) Filed: Nov. 17, 2006

(65) Prior Publication Data
US 2008/0116323 A1    May 22, 2008

(51) Int. Cl.
*B64C 1/38* (2006.01)

(52) U.S. Cl. .............. 244/130; 244/53 R; 244/204; 60/226.1; 60/262

(58) Field of Classification Search ............. 244/130, 244/53 R, 204; 60/226.1, 262
See application file for complete search history.

(56) References Cited

U.S. PATENT DOCUMENTS

| 3,568,790 A | 3/1971 | Sankey |
| 4,228,652 A | 10/1980 | Short |
| 4,410,150 A | 10/1983 | Lahti |
| 4,466,587 A | 8/1984 | Dusa et al. |
| 4,696,159 A | 9/1987 | Horgan |
| 4,799,633 A | 1/1989 | Lahti et al. |
| 2005/0011993 A1* | 1/2005 | Konings .................. 244/198 |

OTHER PUBLICATIONS

International Search Report, PCT/CA2007/001812, Jan. 17, 2008.

* cited by examiner

*Primary Examiner*—J. Woodrow Eldred
(74) *Attorney, Agent, or Firm*—Ogilvy Renault LLP

(57) ABSTRACT

The nacelle drag reduction device comprises a substantially circular and axis symmetrical external airfoil concentric with a aft section of the nacelle and located outside a propulsive jet zone defined behind the engine when operating, the airfoil being positioned at a location providing a maximum streamline angle with reference to the main axis of the engine and a highest streamline curvature.

10 Claims, 2 Drawing Sheets

NACELLE DRAG REDUCTION DEVICE FOR A TURBOFAN GAS TURBINE ENGINE

TECHNICAL FIELD

The invention relates to a nacelle drag reduction device, and in particular to a device and a method for enhancing nacelle external flow conditions on a confluent flow turbofan gas turbine engine.

BACKGROUND

A turbofan gas turbine engine is generally located in an aircraft enclosure which is referred to as the nacelle. The nacelle provides a smooth contour around the gas turbine engine. In a confluent flow turbofan gas turbine engine, the nacelle covers entirely or almost entirely the engine.

When operating, the propulsive jet behind a turbofan gas turbine engine forces the nacelle external flow stream lines to bend inwards near the rear thereof. The stream line curvature is associated with a pressure gradient pointing away from the nacelle, such that the aft section of the nacelle is subjected to a low pressure which increases nacelle drag when the aircraft is moving. The jet induced nacelle drag is somewhat directly proportional to the jet core flow rate and the mixing intensity at the jet boundary behind the engine. Nacelle drag can also increase due to noise reduction measures such as chevrons or lobed nozzles, which increase the entrainment rate of the ambient fluid around the nacelle.

Overall, it was desirable to provide a way to mitigate the nacelle drag resulting from the ambient fluid entrainment by the propulsive jet.

SUMMARY

In one aspect, the present concept provides a nacelle drag reduction device for a confluent flow nacelle of a turbofan gas turbine engine having a main axis, the device comprising a substantially circular and axis symmetrical external airfoil concentric with a aft section of the nacelle and located outside a propulsive jet zone defined behind the engine when operating, the airfoil being positioned at a location providing a maximum streamline angle with reference to the main axis of the engine and a highest streamline curvature.

In another aspect, the present concept provides a method of enhancing external flow conditions around a nacelle of an aircraft-mounted confluent flow gas turbine engine, the method comprising: operating the engine and creating an ambient fluid entrainment behind the engine; and deflecting ambient air entrained around the nacelle to reduce jet induced nacelle drag, the ambient air being deflected upstream the propulsive jet zone.

Further details of these and other aspects of the nacelle drag reducing device and method will be apparent from the detailed description and figures included below.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
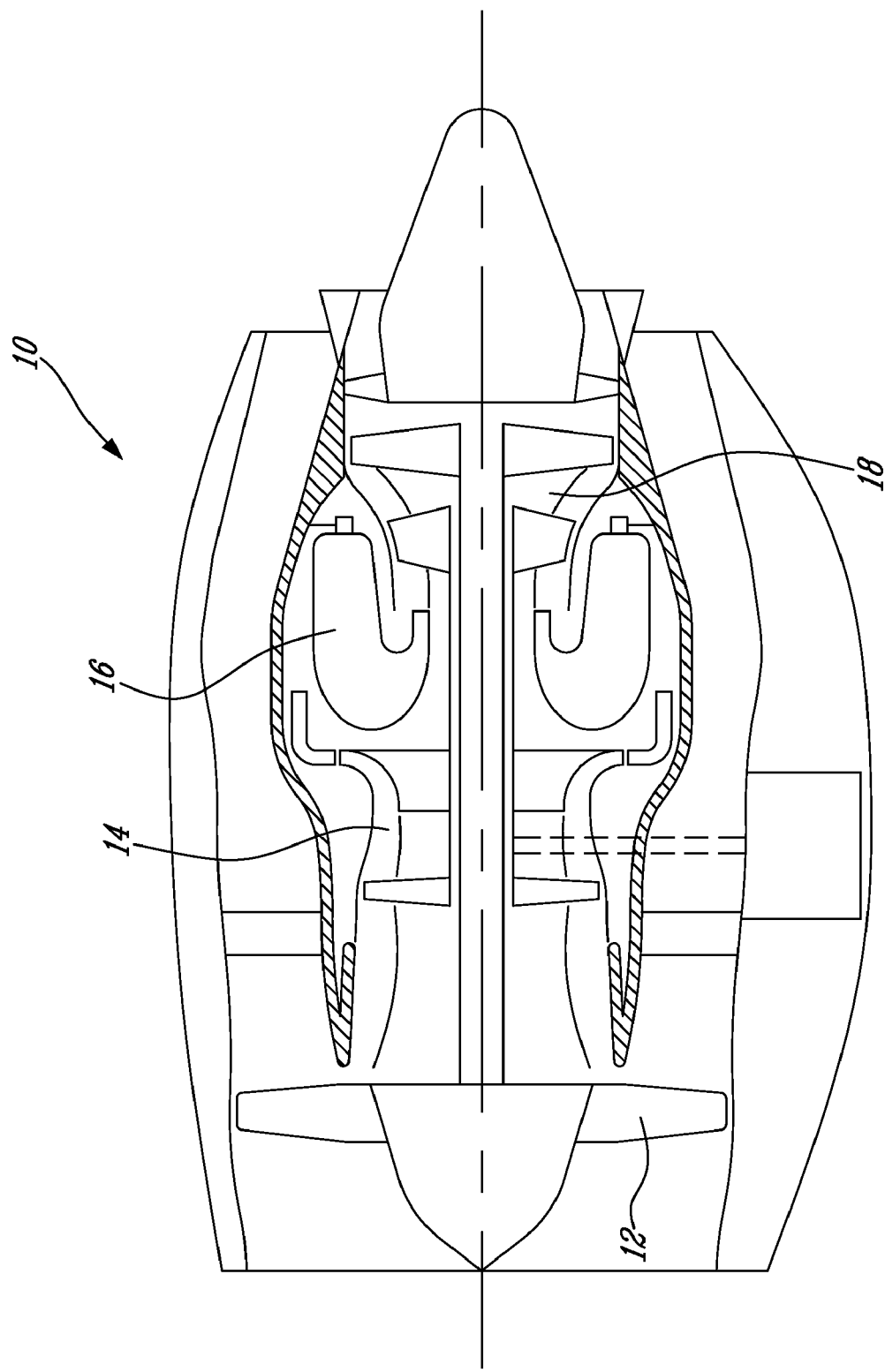
FIG. 1 schematically shows an example of a prior art generic gas turbine engine to illustrate an example of a general environment around which the nacelle drag reduction device can be used.

FIG. 1 illustrates a confluent flow turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The engine 10 is located inside a nacelle 20. In a confluent flow turbofan engine, such as engine 10, the nacelle 20 at least covers a significant portion of the aft section of the engine 10. In some designs, it may cover the entire aft section.

Figure 2:
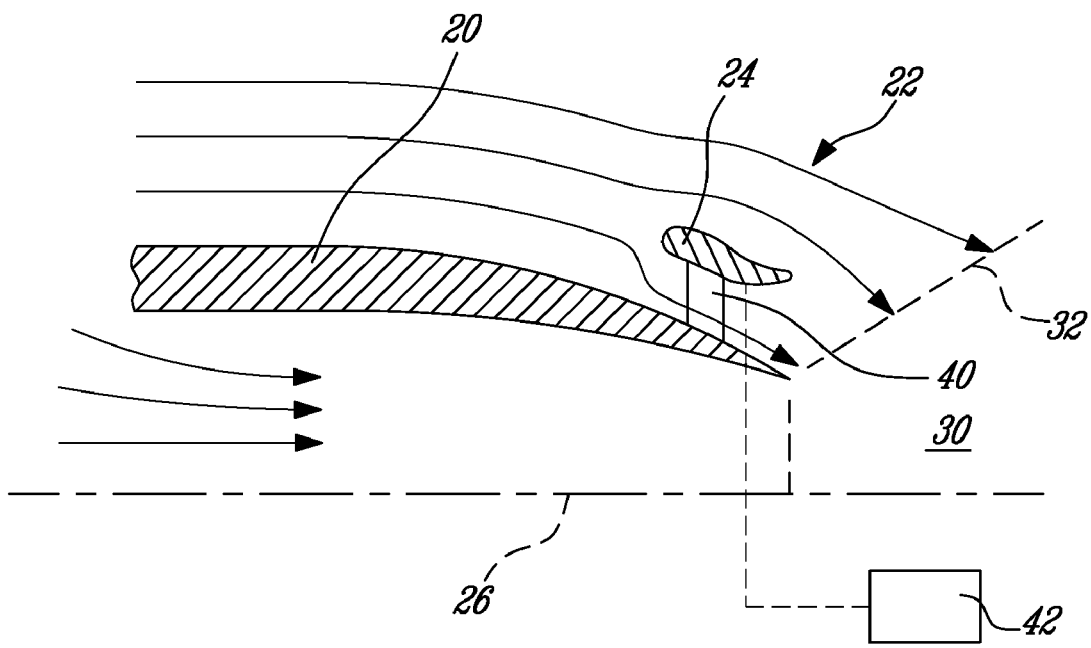
FIG. 2 is a schematic cross-sectional view of an example of a nacelle drag reduction device.

Referring now to FIG. 2, there is shown a schematic example of the upper half of an aft section of the nacelle 20, in a longitudinal cross section, on which is provided a nacelle drag reduction device 22. The nacelle drag reduction device 22 comprises a hypercritical airfoil 24 which is substantially circular and axis symmetrical with reference to the central axis 26 of the aft section of the nacelle 20. The airfoil 24 is concentric with the aft section of the nacelle 20 and is located outside or adjacent to the propulsive jet zone 30 defined behind the engine to avoid excessive flutter. The propulsive jet zone 30 is delimited by a boundary, hereafter called the jet boundary 32.

Because of the relatively high momentum of the gases at the outlet of the engine, the ambient air surrounding the engine is entrained and thereby accelerated near the outer surface of the nacelle 20.

Figure 3:
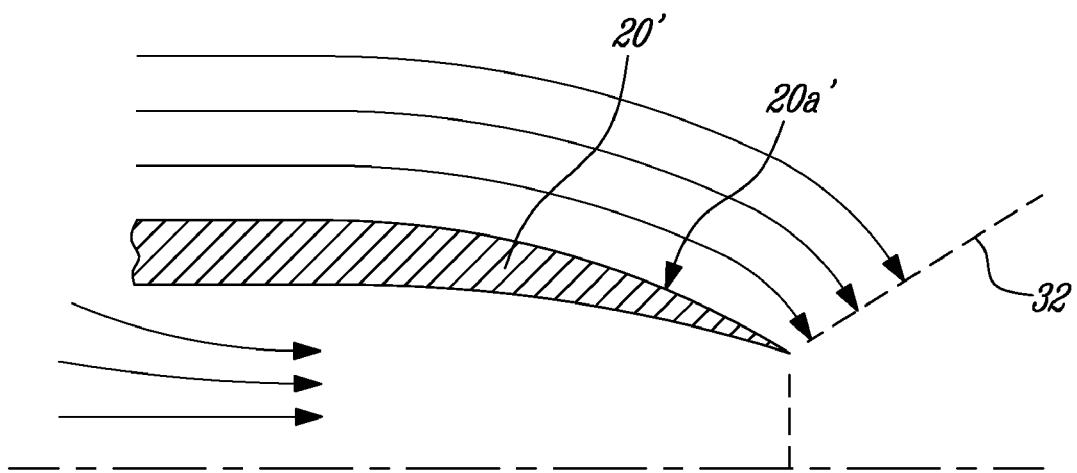
FIG. 3 is a schematic cross-sectional view showing the nacelle of FIG. 2 without the device.

FIG. 3 shows an example of the upper half of a nacelle 20' without the nacelle drag reduction device. As can be seen, the nacelle rear external flow stream lines bend inwards. The aft section 20a' of the nacelle 20' is then subjected to a low pressure which increases nacelle drag. The jet induced nacelle drag is somewhat directly proportional to the jet core flow rate and the mixing intensity at the jet boundary 32' behind the engine.

Referring back to FIG. 2, the airfoil 24 deflects ambient air entrained around the nacelle 20 to reduce the jet induced nacelle drag. The airfoil 24 is supported around the nacelle 20 by mean of narrow supports 40 located at various locations around the circumference of the nacelle 20. The airfoil 24 is configured and disposed to improve the nacelle external flow conditions. The exact shape, angle of attack and configuration of the airfoil 24 will vary in accordance with the specific operational parameters of the gas turbine engine.

The optimal position of the airfoil relative to the nacelle, under any conditions, is at the location where the flow streamlines have the highest deflection angle relative to the engine axis and the highest curvature.

In use, operating the engine creates a propulsive jet zone behind it. The airfoil 24 is provided to deflect ambient air entrained around the nacelle 20. The airfoil 24 is designed to increase the pressure on the aft section of the nacelle 20, by reducing or even changing the direction of the stream line curvature at distances at least comparable to the airfoil chord. The airfoil lift and drag give a forward pointing component while the radial component is cancelled due to symmetry.

The operation of the nacelle drag reduction device 20 can be optimized using one or more air circulation control devices normally encountered on aircraft wings such as trailing edge flaps, leading edge slots, blown flaps, Coanda effect leading and trailing edge jets, plasma actuators, jet actuators and shape control actuators, all of which are generically illustrated in FIG. 2 with the block diagram 42. These devices 42 may work intermittently, continuously or in a periodic manner in function of the flight speed and engine thrust settings. If desired, the circulation control devices 42 can be used asymmetrically for the purpose of thrust vectoring.

The above description is meant to be exemplary only, and one skilled in the art will recognize that other changes may also be made to the embodiments described without departing from the scope of the invention disclosed as defined by the appended claims. For instance, the present invention is not limited to a nacelle drag reduction device including an airfoil as illustrated in FIG. 2. Other shapes can be used as well. Similarly, the turbofan gas turbine engine may be different from the one shown in FIG. 1. If desired, the airfoil may be retractable at high transonic speeds. The airfoil may be provided in different circumferential sections separated by spaces. Still other modifications which fall within the scope of the present invention will be apparent to those skilled in the art, in light of a review of this disclosure, and such modifications are intended to fall within the appended claims.

What is claimed is:

1. A nacelle drag reduction device for a confluent flow nacelle of a turbofan gas turbine engine having a main axis, with flow stream lines of ambient air along the nacelle resulting from forward movement of the nacelle during operation of the turbofan gas turbine engine, the device comprising a substantially circular and axis symmetrical external airfoil concentric with a aft section of the nacelle and located outside a propulsive jet zone defined behind the engine when operating, the airfoil being positioned at a location providing a maximum angle of the stream lines with reference to the main axis of the engine and a highest curvature of the stream lines.

2. The device as defined in claim 1, further comprising means for controlling air circulation around the airfoil.

3. The device as defined in claim 2, wherein the means for controlling are operated intermittently.

4. The device as defined in claim 2, wherein the means for controlling are operated continuously.

5. The device as defined in claim 2, wherein the means for controlling are operated periodically.

6. The device as defined in claim 2, wherein the means for controlling are operated asymmetrically around the airfoil for the purpose of thrust vectoring.

7. A method of enhancing external flow conditions around a nacelle of an aircraft-mounted confluent flow gas turbine engine, the method comprising:
    operating the engine and creating fluid stream lines along the nacelle, and an ambient fluid entrainment behind the engine; and
    deflecting the fluid stream lines of ambient air to reduce jet induced nacelle drag, the ambient air being deflected upstream the propulsive jet zone.

8. The method as defined in claim 7, wherein ambient air is deflected by a substantially circular and axis symmetrical external airfoil concentric with an aft section of the nacelle and located outside the propulsive jet zone defined behind the engine when operating.

9. The method as defined in claim 8, further comprising:
    controlling air circulation around the airfoil.

10. The method as defined in claim 9, wherein the air circulation around the airfoil is controlled asymmetrically for thrust vectoring.

* * * * *